United States Patent [19]

Holley

[11] 4,271,820
[45] Jun. 9, 1981

[54] SOLAR HEAT STRUCTURE

[76] Inventor: Danforth Holley, 521 Lake Shore Rd., Grosse Pointe Shores, Mich. 48236

[21] Appl. No.: 39,682

[22] Filed: May 16, 1979

[51] Int. Cl.³ ................................................. F24J 3/02
[52] U.S. Cl. ................................... 126/417; 126/449; 126/439
[58] Field of Search ............... 126/417, 438, 439, 418, 126/429, 441, 446, 432, 449, 450

[56] References Cited

U.S. PATENT DOCUMENTS

| 4,079,724 | 3/1978 | Zwillinger | 126/441 |
| 4,084,581 | 4/1978 | Vigoureux | 126/438 |
| 4,131,109 | 12/1978 | Coxon et al. | 126/438 |
| 4,201,194 | 5/1980 | Charles | 126/449 |

FOREIGN PATENT DOCUMENTS

| 2339141 | 1/1976 | France | 126/449 |
| 1524961 | 9/1978 | United Kingdom | 126/449 |

Primary Examiner—James C. Yeung
Assistant Examiner—Larry Jones
Attorney, Agent, or Firm—Whittemore, Hulbert & Belknap

[57] ABSTRACT

Solar heat structure comprising a solar collector which may be parabolic and a diffusing element positioned axially of the solar collector for diffusing the sun's rays in the collector to thereby increase the heat collected by the solar collector for any given quantity of sun rays directed thereto.

7 Claims, 5 Drawing Figures 4,271,820

SOLAR HEAT STRUCTURE

BACKGROUND OF THE INVENTION

1. Field of the Invention

The invention relates to solar heat structures and refers more specifically to a solar collector and a diffusing element positioned centrally of the collector for increasing the heat collected by the solar collector.

2. Description of the Prior Art

In the past, solar heat structures have usually included some type of solar collector for absorbing heat in accordance with the sun's rays striking the solar collector. No prior means for diffusing the sun's rays in the solar collector to enhance the heat collected by the collector from the sun's rays in known.

SUMMARY OF THE INVENTION

In particular, the invention is the provision of a diffusing member centrally of a solar collector having reflecting elements whereby sun rays passing into the collector and/or reflecting therefrom are again reflected and diffused within the collector whereby the amount of heat absorbed by the collector for a given quantity of sun rays directed thereto is increased.

In particular, the diffuser of the invention is in the general shape of a Christmas tree having a central trunk or axis with reflecting fingers or branches extending outwardly from the axis thereof. The outer ends of the reflecting fingers of the upper portion of the diffuser define an angle of between 30° and 60° with respect to the axis of the diffuser.

DESCRIPTION OF THE PREFERRED EMBODIMENT

Figures 1, 2:
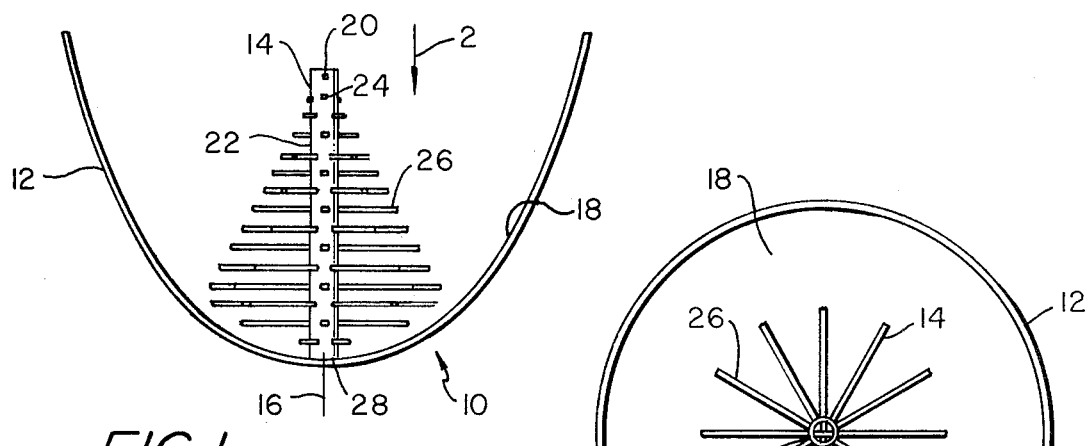
FIG. 1 is a longitudinal section view of solar heat structure constructed in accordance with the invention including a parabolic solar collector having a diffuser secured therein axially thereof.
FIG. 2 is a top view of the solar heat structure illustrated in FIG. 1, taken substantially in the direction of arrow 2 in FIG. 1.

As shown in FIGS. 1 and 2, the solar heat structure 10 includes a parabolic solar collector 12 and a diffuser 14 secured to the parabolic collector 12 on the axis of generation 16 thereof.

More particularly, the parabolic solar collector 12 may be constructed of aluminum or other metal and is provided with a dark, heat absorbing inner surface 18. The parabolic solar collector 12 has a focus 20 on the axis of generation 16 thereof, as shown in FIG. 1.

The function of the solar collector 12 is to absorb heat on receiving sun rays directed into the solar collector. To this end, if the material of which the solar collector 12 is constructed is not such as to provide a heat absorbing surface 18, during manufacture of the solar collector the surface 18 may be painted with for example a black and/or rough and low-reflecting surface for maximum heat absorption.

The diffuser 14 as shown in FIGS. 1 and 2 is a metal tube 22, 0.375 inches in diameter ±0.002 inches and 0.03125 inches in thickness ±0.002 inches, having angularly and axially spaced apart transverse openings 24 therein. The diffuser 14 is completed by placing a plurality of strips of metal foil such as aluminum foil 26 through the transverse openings 24 in the tube 22. The metal foil strips are 0.015625 inches thick ±0.002 inches and are cut and positioned in the tube 22 so that the completed diffuser 14 resembles a Christmas tree having sides which make an angle of between 30° and 60° with respect to the central axis of the diffuser except at the bottom thereof where the foil strips are terminated at approximately equal distances from the surface 18 of the collector 12.

The diffuser 14 is secured to the solar collector 12 with the axis of the tube 22 congruent with the axis of generation of the solar collector 12 by convenient means such as an adhesive securing the end 28 of the tube 22 to the solar collector 12, as shown in FIG. 1.

The diffuser 14 increases the heat collected by the solar collector 12. The diffuser 14 causes diffusion of the sun's rays within the collector and thus maintains sun rays which might otherwise be reflected from the solar collector 12 within the solar collector for a longer period of time than would be the case without the diffuser 14 in the collector 12.

Thus, for example, in a particular solar heater device, as disclosed in copending application Attorney Case No. 54,199, a diffuser constructed in accordance with the present invention was placed in the collector in the upper right hand corner of the solar heater and a 15° temperature rise in the collector in the solar heater at the upper right hand corner of the solar heater was recorded in thirty minutes. There was no noticeable change in temperature in the collector at the upper left hand corner of the solar heater. Subsequently, the diffuser was placed in the center collector in the third row from the top of the solar heater and an increase in temperature of 58° at the collector with the diffuser therein was recorded in one and one-half hours. Such test results show the value of a diffuser constructed as shown and described and positioned in a solar collector axially thereof in collecting heat due to solar radiation for use in solar heaters and the like.

Figures 3, 4:
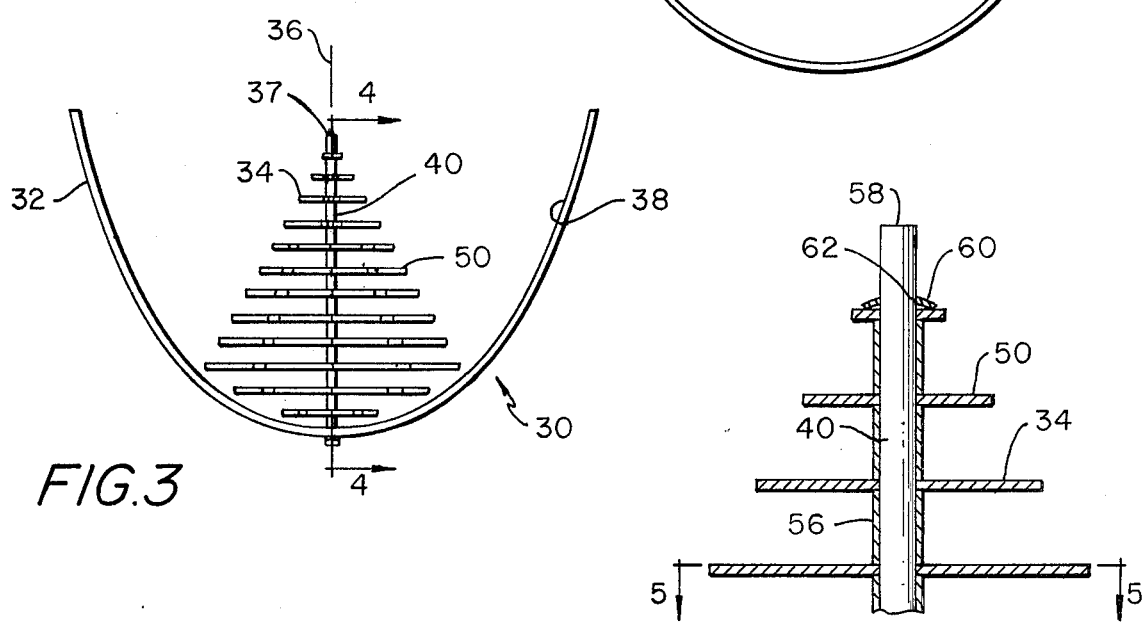
FIG. 3 is a longitudinal section view of modified solar heat structure constructed in accordance with the invention including a parabolic solar collector as shown in FIG. 1 and a modified diffuser secured to the collector axially thereof.
FIG. 4 is an enlarged, partly broken away section view of the solar heat structure shown in FIG. 4, taken substantially on the line 4—4 in FIG. 3.

In a modification of the invention, as shown for example in FIGS. 3 and 4, the solar heat structure 30 again includes a collector 32 and a diffuser 34. The collector 32, as before, is parabolic, has an axis of generation 36, a focus 37 and has a heat absorbing surface 38.

Figure 5:
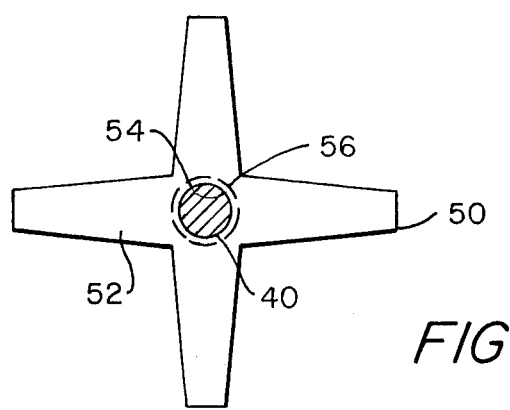
FIG. 5 is a section view of the solar heat structure illustrated in FIG. 4, taken substantially on the line 5—5 in FIG. 4.

The diffuser 34, as best shown in FIGS. 4 and 5, includes a cylindrical rod 40 which may be of aluminum or other metal and which has a reduced diameter threaded end 42. As shown in FIG. 4, the reduced diameter threaded end 42 of the rod 40 is passed through an opening 44 in the parabolic solar collector 32 with the rod 40 extending on the axis of generation of the solar collector 32 and the rod is secured to the collector 32 by means of the nut 46 and washer 48.

Reflecting members 50, as best shown in FIG. 5, are constructed of reflecting material such as metal or metal foil in the shape shown having four or six reflecting finger portions 52. The reflecting members 50, as shown, are provided with an opening 54 centrally thereof and are sleeved over the rod 40.

As shown best in FIG. 4, the reflecting members 50 are spaced axially on the rod 40 by means of short spacing tubes 56. The reflecting member 50 closest to the end 58 of the diffuser 34 is secured in axial position on the rod 40 against a spacing tube 56 by convenient means such as the dished fastener 60. As before, the reflecting fingers 50 are terminated to form a Christmas tree like structure of the diffuser terminating at the focus 37 of the collector as shown best in FIG. 3.

In assembly with the parabolic solar collector 38, the diffuser 34 increases the heat absorbed from a given quantity of sun rays. As indicated above, it is believed that the added heat absorption by the solar collector is due to diffusion of sun rays within the solar collector so that the rays have a second, third, fourth, etc., reflection onto the surface 38 of the solar collector 32.

While one embodiment of the invention, together with one modification thereof, have been considered in detail, it will be understood that other embodiments and modifications thereof are contemplated by the inventor. It is the intention to include all embodiments and modifications as are defined by the appended claims within the scope of the invention.

I claim:

1. A diffuser for a solar collector said diffuser having an axis and comprising a plurality of elongated, narrow reflecting fingers and means for supporting the reflecting fingers axially of the diffuser with the reflecting fingers in spaced apart locations angularly and axially of the diffuser, said reflecting fingers defining the general shape of a Christmas tree and having outer tips generally defining a line diverging toward the bottom of the Christmas tree at an angle of between 30° and 60° with respect to the axis of the diffuser.

2. Structure as set forth in claim 1, wherein the means for supporting the reflecting fingers comprises a tube extending axially of the diffuser having axially and angularly spaced apart transverse openings therethrough and the reflecting fingers are metal foil strips extending through the transverse openings in the tube.

3. A diffuser for a solar collector said diffuser having an axis and comprising a plurality of reflecting fingers and means for supporting the reflecting fingers axially of the diffuser with the reflecting fingers in spaced apart locations axially of the diffuser including a rod extending axially of the diffuser, means at one end of the rod for securing the diffuser to a solar collector, said reflecting fingers being part of a plurality of reflecting members sleeved over the rod having finger portions extending outwardly from the axis of the diffuser, spacing means positioned between the reflecting members for spacing the reflecting members axially of the rod, and means at the other end of the rod for preventing removal of the reflecting members and spacing means from the other end of the rod, said reflecting fingers defining the general shape of a Christmas tree and having outer tips generally defining a line diverging toward the bottom of the Christmas tree at an angle of between 30° and 60° with respect to the axis of the diffuser.

4. Solar heat structure comprising a concave solar heat collector having an axis of generation and a reflecting diffuser positioned axially of and operably associated with the collector constructed of reflecting material in the general shape of a Christmas tree, said diffuser diverging inwardly toward the collector from the outer end of the diffuser at an angle of between 30° and 60° with respect to the axis of the collector and being constructed of a central tube having transverse openings extending therethrough and metal foil strips extending through the transverse openings in the tube.

5. Solar heat structure comprising a concave solar heat collector having an axis of generation and a reflecting diffuser positioned axially of and operably associated with the collector constructed of reflecting material in the general shape of a Christmas tree, said diffuser diverging inwardly toward the collector from the outer end of the diffuser at an angle of between 30° and 60° with respect to the axis of the collector and being constructed of a rod extending axially from the collector on the axis of the collector, on end of which is connected to the collector, a plurality of reflecting members having finger portions extending outwardly from the center of the rod sleeved over the rod and short lengths of spacing tubing sleeved over the rod and positioned between the reflecting members to space the reflecting members from each other along the rod.

6. Solar heat structure comprising a parabolic collector having a dark, rough inner surface for absorbing heat from sun rays, an axis of generation and a focus and a diffuser comprising a tube extending axially of the parabolic collector, one end of which is secured to the parabolic collector on the axis thereof and the other end of which terminates at the focus of the parabolic collector, said tube having angularly and axially spaced apart transverse openings therethrough, said diffuser further including metal foil reflecting strips passing through the transverse openings in the tube forming with the tube a Christmas tree like configuration having a bottom adjacent the point of connection of the tube to the parabolic collector and a top at the focus of the parabolic collector.

7. Solar heat structure comprising a parabolic collector having a dark, rough inner surface for absorbing heat from sun rays, an axis of generation and a focus, and a diffuser comprising a rod having a reduced diameter threaded end thereon, an opening through the parabolic collector on the axis of generation thereof through which the threaded end of the rod extends, nut and washer means on the threaded end of the rod extending through the opening in the parabolic collector securing the rod to the parabolic collector, a plurality of reflecting members each having a plurality of reflecting fingers extending from the center thereof, the center of each reflecting member having an opening therein, said reflecting members being sleeved over the rod, a plurality of cylindrical spacing members sleeved over the rod, at least one of which is positioned between at least some of the reflecting members whereby at least some of the reflecting members are spaced from each other axially on the rod and means for preventing movement of the reflecting members from the other end of the rod.

* * * * *